United States Patent

[11] 3,617,894

[72] Inventor Marcel E. Benoit
34, Quai Louis-Bleriot, Paris, 16°, France
[21] Appl. No. 734,321
[22] Filed June 4, 1968
[45] Patented Nov. 2, 1971
[32] Priority Sept. 27, 1967
[33] France
[31] 122,394

[54] TWO-TRANSMITTER RADIO BEACON
5 Claims, 7 Drawing Figs.

[52] U.S. Cl. 325/166, 325/115, 325/164, 343/101
[51] Int. Cl. H04b 1/04
[50] Field of Search 325/111, 115, 116, 117, 166, 152, 182, 169, 164; 343/101

[56] References Cited

UNITED STATES PATENTS

| | | | |
|---|---|---|---|
| 3,108,223 | 10/1963 | Hunter | 325/105 |
| 3,176,229 | 3/1965 | Pierce | 325/105 |
| 3,274,588 | 9/1966 | Brown | 340/384 |
| 3,299,356 | 1/1967 | Bornhorst | 325/105 |

*Primary Examiner*—Robert L. Griffin
*Assistant Examiner*—Kenneth W. Weinstein
*Attorney*—Karl F. Ross

ABSTRACT: A radio beacon generating an audio-modulated UHF signal has two transmitters keyed by the outputs of independent square-pulse generators. Each pulse generator works into an associated amplifier stage, an inversion of the output of the pulse generator feeding the first transmitter being also supplied to the amplifier stage of the second transmitter (in parallel with the output of the other pulse generator) whereby the complement of the keying signal of the first or master transmitter normally overrides the keying signal of the second or slave transmitter and the two transmitters operate at interleaved intervals. If the master transmitter should fail, the slave transmitter continues operating in the rhythm of its own keying signal.

Marcel E. BENOIT
Inventor.

Karl F. Ross
Attorney

Marcel E. BENOIT
Inventor.

Karl G. Ross
Attorney

Marcel E. BENOIT
Inventor.

Karl F. Ross
Attorney

Marcel E. BENOIT
Inventor.

Karl F. Ross
Attorney

TWO-TRANSMITTER RADIO BEACON

My present invention relates to a radio beacon adapted to be mounted on an object to be located, such as the head of a missile or rocket, the nacelle of a sounding balloon or the like, carrying recording equipment which it is desired to recover after an exploratory mission.

Such a beacon, mounted on its carrier vehicle, transmits a radio signal which, when picked up by a suitably equipped receiver station on board an aircraft or ship, ensures the guiding of the latter towards the emission point.

Conventional radio-beacon transmitters have considerable weight, particularly if the emission power has to be high, which is especially disadvantageous since, for reasons of safety, it is often necessary to provide two such devices in the head of a rocket or the nacelle of a sounding balloon. These devices are subjected to severe conditions of use because of the environment and/or of vibrations and shocks which may occur, particularly on impact with the ground or the sea.

It is an object of the invention to provide a transmitting apparatus which can be used in particular as a radio homing beacon for the tracing of an object equipped with it, which is of very reduced dimensions and weight and which, despite its small dimensions, emits a signal of high power.

It is also an object of the invention to provide a transmitting apparatus which can be coupled in a very simple manner to an identical apparatus in order that the assembly may transmit signals in a predetermined sequence.

In this connection, it is an object of the invention to provide an assembly of two signal emitters so designed that the accidental stopping of one of them has no effect on the operation of the other.

Other advantages of the invention will be apparent from the following description of a preferred embodiment given by way of example and with reference to the accompanying drawings in which.

Figure 1:
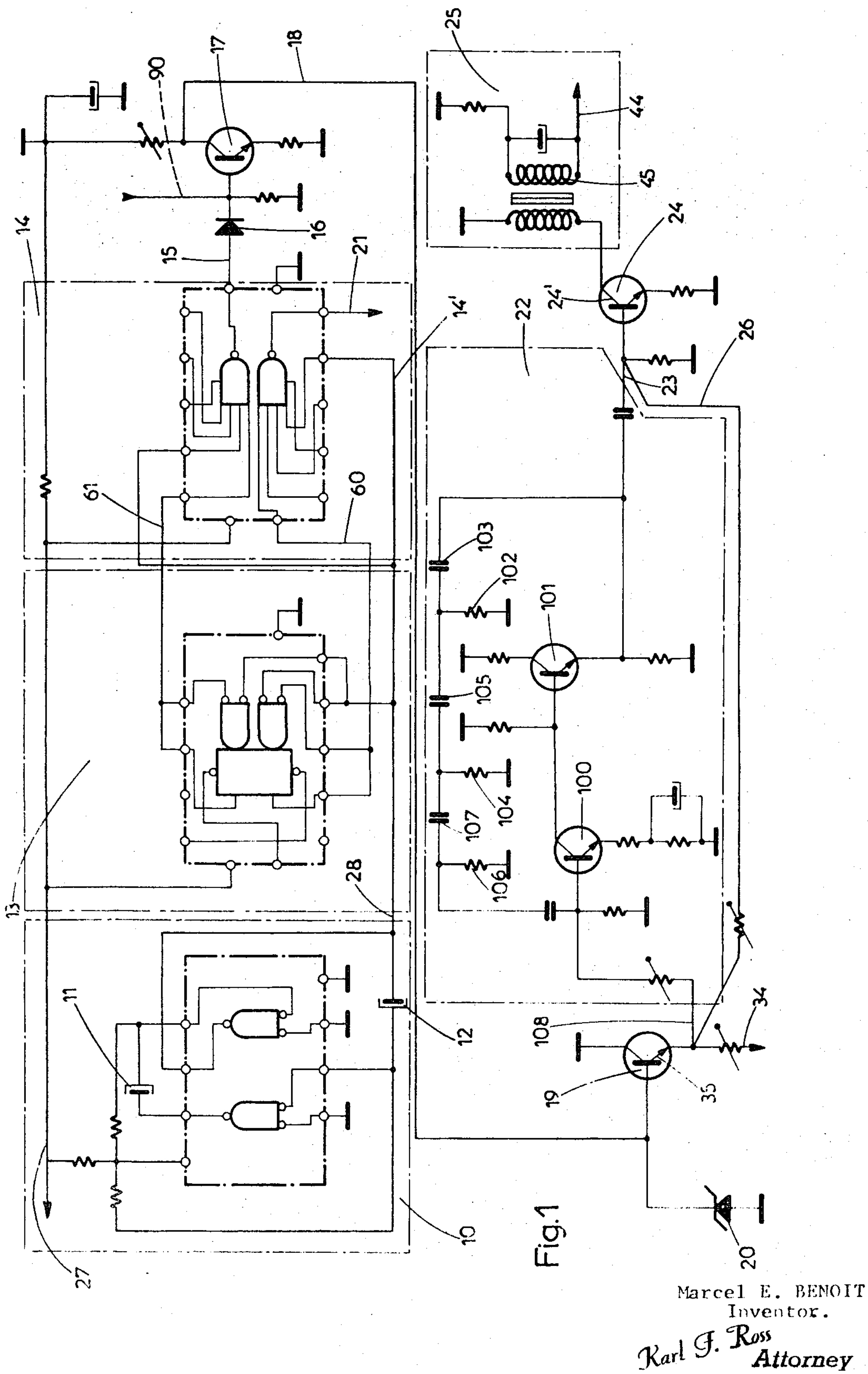
FIG. 1 is a circuit diagram of a portion of an apparatus according to the invention.

The transmitting apparatus according to the invention, which is adapted to transmit a chopped signal at a frequency in the UHF band, for instance 240.8 M.c.p.s., comprises in its low-frequency section (FIG. 1) a multivibrator 10, with feedback capacitors 11 and 12, its output being fed by capacitor 12 via a lead 14' to a bistable circuit or flip-flop 13 connected by conductors 60, 61 to a double AND-gate 14 which also receives, simultaneously, signals leaving the multivibrator 10 over the conductor 14'. One of the outputs of the coincidence gate 14 is connected through a conductor 15 and a diode 16 to a transistor 17 whose output 18 is connected to a transistor 19 with an emitter-follower connection; another output of the gate 14 is constituted by a conductor 21. A Zener diode 20 connected to the collector of the transistor 17 serves as a voltage stabilizer.

According to the invention, the combination of stages 10, 13 and 14 (each of which is a thin-film integrated circuit with dimensions of the order of a few square millimeters, e.g. diode-transistor logic circuits as used in electronic computers) is a square-pulse generator adapted to supply a signal so controlling the oscillation and modulation means of the system as to transmit a chopped signal.

The signals leaving the transistor 19 act via a lead 108 on a phase-shift oscillator 22 which, at its output 23, delivers an alternating signal at a frequency of 1,000 c.p.s. in the example under consideration. The oscillator 22 consists of an amplifying transistor 100, an amplifying and impedance-matching transistor 101 and resistance-capacitance circuits 102–103, 104–105, 106–107 introducing phase shifts in the output of the transistor 101 which combine to apply to the transistor 100 a regenerative feedback in phase with the signal transmitted. The output 23 of the oscillator 22 is connected through an amplifying transistor 24 to a transformer 25 for connection to the high-frequency section of FIG. 2. A conductor 26 interconnects the transistors 19 and 24 to render the latter conducting at predetermined time intervals as will be explained in detail below, thus allowing a chopped signal to appear at its collector 24'.

The high-frequency section of the transmitter (FIG. 2) comprises a quartz-controlled oscillator 30 whose quartz crystal 31 generates a frequency half the transmission frequency, here of 120.4 M.c.p.s. It comprises a transistor 32, whose base 33 is connected through a conductor 34 to the emitter 35 of the emitter-follower transistor 19 (FIG. 1) in such a manner that, in accordance with the invention, the oscillator 30 is only in operation when the transistor 32 is biased into conductivity by a signal present at the emitter 35 of the transistor 19.

The oscillator 30 is followed by a frequency doubler 36 comprising a transistor 37, whose base 38 is grounded at 39 and at whose collector 40 there appears a voltage having a frequency twice that produced by the oscillator 30. This voltage is applied to a modulator 41 comprising an amplifying and modulating transistor 42 whose collector 43 receives, through a conductor 44, the output voltage from the secondary winding 45 of the transformer 25. The output signal from the modulator 41, appearing on a conductor 46, is applied to a power amplifier 47 in which a transistor 48, with a class-C connection, has a low stray capacitance and is capable of delivering a high power of the order of 500 m.W. in the example illustrated. The signal generated on the collector of the transistor 48 is applied to a transmission aerial 49 after adaptation to the impedance of the latter and elimination of the harmonics and of the interference noises by tuned circuits 50 and 51.

A diode 52, in series with an input load from a power 53, serves as a safety device in case of faulty connection.

Figure 3:
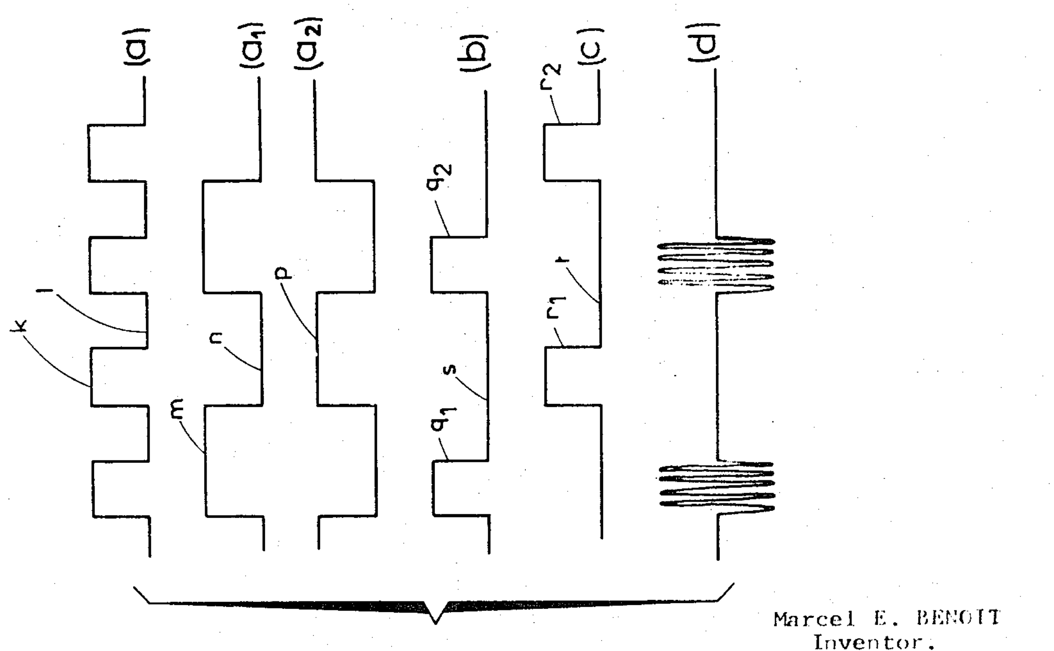
FIG. 3 is a set of graphs relating to the operation of the system of FIGS. 1 and 2.

The operation of a transmitting apparatus according to the invention is as follows:

The multivibrator 10, energized from the supply terminals 53 via a conductor 27, delivers at its output 28 a signal shown at (*a*) in FIG. 3 which comprises square pulses *k* whose width may be 0.5 second, for example, separated by intervals *l* of the same duration. After passing through the flip-flop 13, this signal is converted into two mutually inverted pulse trains as shown at $(a_1)$ and $(a_2)$ (in FIG. 3). The signal $(a_1)$ has square pulses *m* of a width double that of the square pulses *k* of the signal (*a*), the pulses *m* being separated by intervals *n* of the same duration as the pulses. The signal $(a_2)$, identical in shape with the signal $(a_1)$, is of the opposite polarity, having a positive square pulse *p* when the signal $(a_1)$ has an interval *n*, and, leaving no pulse when the signal $(a_1)$ has one. A signal such as $(a_1)$ is present on the conductor 60 simultaneously with a signal such as $(a_2)$ on the conductor 61.

The coincidence gate 14 which receives, simultaneously, the signals (*a*), $(a_1)$ and $(a_2)$ from the multivibrator 10 and the flip-flop 13 respectively delivers at its output 15 a keying signal as shown at (*b*), obtained from the signals $(a_1)$ and (*a*), differing from the latter by the suppression of every even-numbered square pulse. At the same time, the gate 14 delivers at its output 21 an alternate keying signal as shown at (*c*), obtained from the signal $(a_2)$ and from the signal (*a*) and differing from the latter by suppression of every odd-numbered square pulse. The square pulses $q_1$, $q_2$, etc. of the signal (*b*), whose width is the same as that of the square pulses of the signal (*a* ) (i.e. 0.5 second in the example illustrated) are separated from one another by intervals *s* of three times the pulse width, here 1.5 seconds. The same applies to the signal (*c*) whose square pulses $r_1$, $r_2$, having also a width of 0.5 second, are separated by intervals *t* having a duration of 1.5 second.

The keying signals ($b$) and ($c$), shown in FIG. 3, which are the envelopes of the modulation signal generated by stage 41, are offset in relation to one another by a constant time interval equal to a cycle of basis pulses $k$. A square pulse $q_1$ of the signal ($b$) is therefore separated from the next square pulse $r_1$ of the signal $c$) by a time interval equal to the width of these basic pulses, i.e. 0.5 second, and said square pulse $r_1$ is separated from the following pulse $q_2$ of the signal ($b$) by the same interval. The square pulse $r_2$ of the signal ($c$) is in turn separated by the same interval from the square pulse $8_2$ of the signal ($b$), etc.

After amplification in the transistors 17 and 19, FIG. 1, the signal ($b$) is applied over the conductor 34 to the oscillator 30 of the high-frequency section, over the conductor 26 to the transistor 24 and over the conductor 108 to the input of the phase-shift oscillator 22. The latter is thus controlled by an envelope signal as shown at ($b$) whereby oscillations appear at its output only when square pulses $q$are applied to its input. The output of oscillator 22 is therefore a chopped signal as shown at ($d$) in FIG. 3.

The discontinuous operation of the oscillator provides an important saving in power. The use of a phase-shift oscillator controlled by a square wave signal enables a particularly stable oscillation frequency to be obtained notwithstanding the discontinuous operation. )

According to the invention, the oscillator carrier wave 30 is similarly operational only during the time intervals corresponding to the periods of signal transmission, during which intervals transistor 24 is rendered conducting and the modulator 41 is turned on.

The output of the power amplifier 47, delivered to transmitting antenna 49, is a UHF carrier modulated at an audio frequency of 1,000 c.p.s. in bursts of 0.5 second recurring every 1.5 seconds.

For reasons of security, it is frequently desired that the head of a missile or rocket, or the nacelle of a sounding balloon or the like should comprise two transmitters, each equipped with its own aerial, so that if one aerial or one transmitter is damaged, for example at the moment of impact, the other continues to function normally in order to permit the tracing of the signal-emitting object. The radio beacon according to the invention is particularly well adapted in the presence of two transmitting devices, to send out signals in a predetermined sequence such as that illustrated in FIG. 4. A first signal 70, originating at the first transmitter, is succeeded by an absence of emission for a duration equal to that of the signal, e.g., 0.5 second in the present example, and this silence is followed by a second signal 71 of the same duration as the first one but coming from the second transmitter, said second signal being in turn followed by a silence of the same duration, then again by a signal 72 from the first transmitter, etc.

Figure 2:
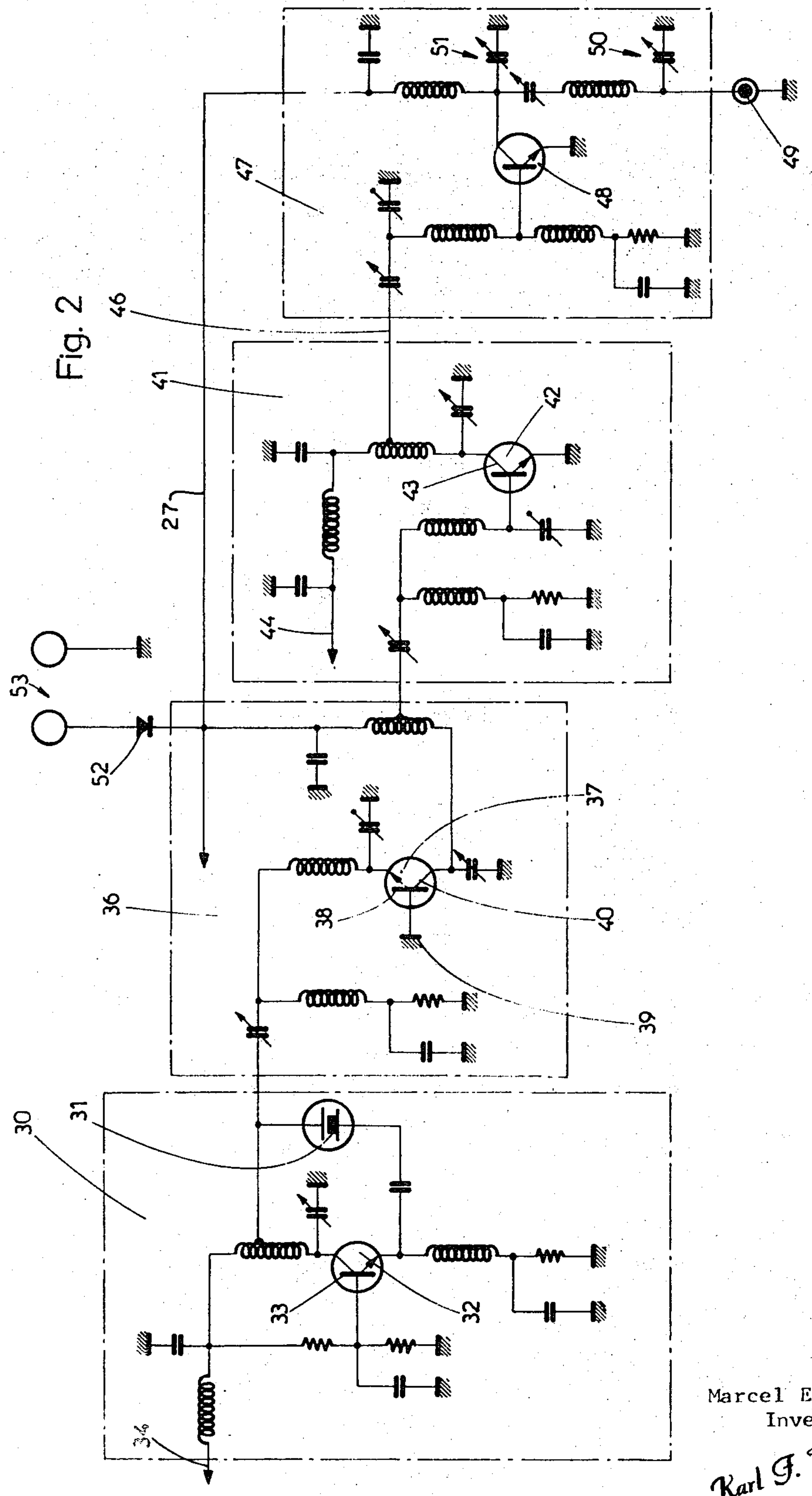
FIG. 2 is a circuit diagram of another portion.
Figure 5:
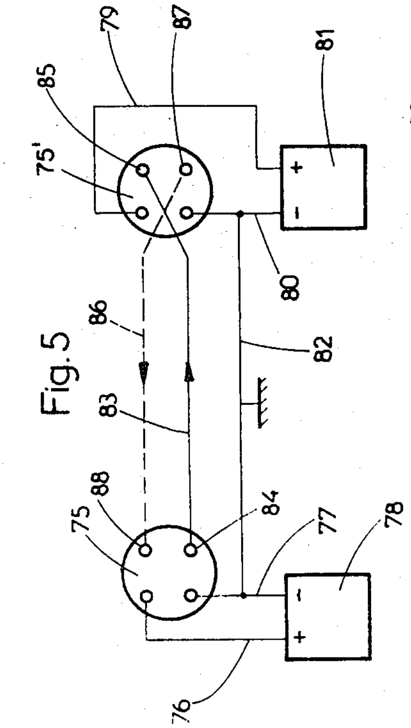
FIG. 5 is a wiring diagram of a combination of two transmitters according to the invention.

In order to deliver a predetermined succession of signals like that referred to above, two devices each identical with that described with reference to FIGS. 1 and 2 are mounted on the head of a rocket, nacelle of a sounding balloon or the like. A first transmitter 75 (FIG. 5) is connected through conductors 76, 77 to a power supply 78, for example a 12-volt battery, and a second transmitter 75, is connected through conductors 79, 80 to a second supply battery 81 identical with the first one, a grounded conductor 82 ensuring the coupling of the two supplies.

Figure 4:
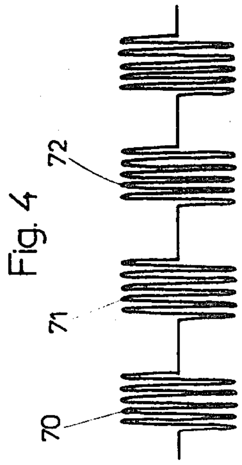
FIG. 4 shows a further graph.

According to the invention, a single conductor 83 interconnecting the two transmitters is sufficient to ensure the required sequence of transmission illustrated in FIG. 4. The conductor 83 is connected on the one hand to an "outgoing synchronization" terminal 84 of the first transmitter 75 and on the other hand to an "incoming synchronization" terminal 85 of the second transmitter 75'. Since the two devices are identical, each comprises an "outgoing synchronization" terminal and an "incoming synchronization" terminal in such a manner that, as illustrated by a dotted line in FIG. 5, a conductor 86 could be connected on the one hand to the "outgoing synchronization" terminal 87 of the second transmitter and on the other hand to the "incoming synchronization" terminal 88 of the first transmitter; in operation, of course, only one of the conductors 83 or 86 is connected in circuit.

Figure 6:
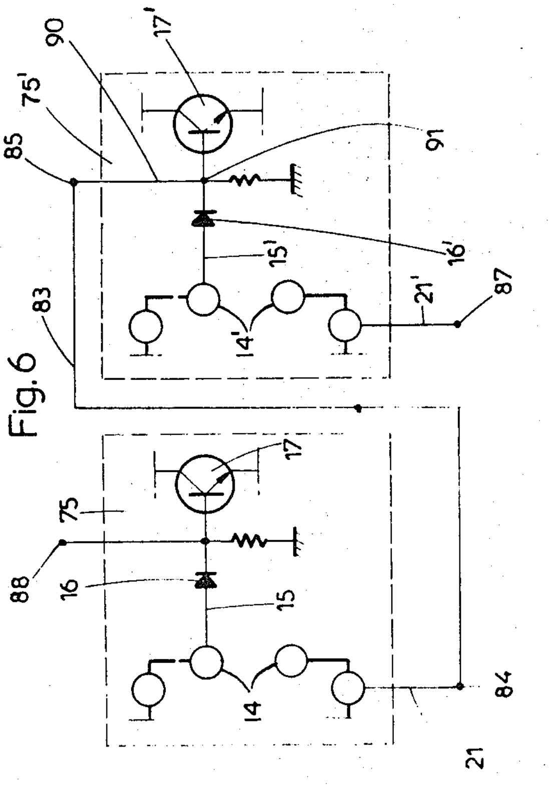
FIG. 6 is a partial circuit diagram showing details of the system of FIG. 5.

The two transmitting devices 75 and 75' being identical, it will be assumed that they are interconnected by the conductor 83 see also (FIG. 6). The elements of the transmitter 75' corresponding to those of the transmitter 75 bear the same reference numerals but with the addition of a prime mark. The terminal 84 constitutes the end of the conductor 21 (FIG. 1) of the transmitter 75 and the terminal 85 constitutes the end of a conductor 90 of the transmitter 75' extending from the junction point 91 between the diode 16' and the transistor 17' of said transmitter. Thus, pulse generator stages 14 and 14' work in parallel into amplifier stage 17 via their respective output leads 21 and 15'.

Figure 7:
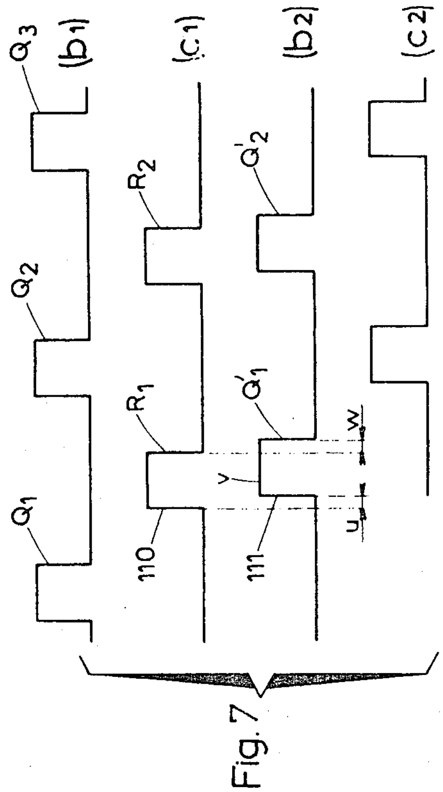
FIG. 7 is a set of graphs relating to the operation of the system of FIGS. 5 and 6.

The operation of the assembly is as follows:

The coincidence gate 14 of the transmitter 75 delivers a signal such as ($b_1$) over the conductor 15 and a signal such as ($c_1$) over the conductor 21 (FIG. 7). The coincidence gate 14' of the transmitter 75' delivers over the conductor 15' a signal such as ($b_2$) identical with the signal ($b_1$) but generally staggered with reference thereto, and over the conductor 21' a signal ($c_2$) identical with the signal ($b_2$) yet with a constant relative phase displacement; signal ($c_2$) is not used if, as indicated above, the transmitter 75 is connected to the transmitter 75' by the conductor 83.

When a signal such as ($b_1$) is present on the conductor 15 of the transmitter 75, a signal such as ($c_1$) is present on the conductor 21 and is applied through the conductor 83 and the conductor 90 to the point 91 of the transmitter 76. If the signals ($c_1$) and ($b_2$) are synchronous, i.e., if the square pulses $R_1$, $R_2$... etc. of the signal ($c_1$) coincide with the square pulses $Q'_1$, $Q'_2$... etc. of the signal ($b_2$), the desired sequence of transmission is obtained for the assembly of the two transmitters since the signals ($b_1$) and ($b_1$) which control the transmission have a constant phase difference, the signals ($b_1$) and ($c_1$) having a constant relative phase displacement. To the square pulses $Q_1$, $Q_2$ etc. of the envelope signal ($b_1$) corresponds an emission by the transmitter 75 and to the square pulses $Q'_1$, $Q'_2$ etc., coinciding with the square pulses $R_1$, $R_2$ etc. of the envelope signal ($b_2$), corresponds an emission by the transmitter 75'.

If the signals ($b_2$) and ($c_1$) are not synchronous, then it is the latter which controls the transistor 17' of the transmitter 75' in the following manner: during the time interval $u$ (FIG. 7) separating the leading edge 110 of a square pulse $R_1$ from the leading edge 111 of a square pulse $Q'_1$, the positive control voltage of the transistor 17' is that of the square pulse $R_1$ applied over the conductor 90; in the interval $v$ during which the square pulses $R_1$ and $Q'_1$ are superimposed, the transistor 17' is still conducting because both the conductor 15' and the conductor 90 apply a positive voltage thereto. During the interval $w$ which corresponds to the lag of the square pulse $Q'_1$ behind the square pulse $R_1$, with the signal ($C_1$) going to zero, the point 91 is grounded while the diode 16' prevents a return current towards the unit 14'; the transistor 17' is therefore no longer conducting.

There is thus ensured an alternate transmission from the two signal emitters in the sequence illustrated in FIG. 4; during the time interval corresponding to the square pulse $Q_1$, it is the transmitter 75 which is operational, the transmitter 75' being afterwards operational during the interval corresponding to the square pulse $R_1$, whereupon the transmitter 75 radiates again during the interval corresponding to the square pulse $Q_2$, etc. Thus, the inverted keying signal ($c_1$) from the master transmitter 75 overrides the normal keying signal ($b_2$) of the shave transmitter 75'.

If the transmitter 75 is damaged on impact, or if the connection 83 is broken, the transmitter 75' continues its operation under the control of its own envelope signal ($b_2$), thereby again generating a chopped signal which, in the example of the described embodiment, is a carrier modulated at 1000 cps for recurring in bursts of 0.5 second every 1.5 second. Conversely, if it is the transmitter 75' which is damaged on impact, the transmitter 75 maintaining the transmission of the chopped signal adapted to permit the tracing of the object which carries it.

The maintenance and repair of the two identical transmitting devices is easy and their interconnection through a single conductor ensures reliable operation in accordance with a predetermined transmission cycle in a particularly simple manner.

I claim:

1. A radio beacon comprising a high-frequency oscillator; a low-frequency phase-shift oscillator; modulating means connected to receive the outputs of said oscillators for generating a modulated carrier wave; a source of keying pulses connected to both said oscillators for simultaneously turning same on and off in a predetermined rhythm, said source comprising a square wave generator producing a first pulse train, bistable means connected to said square wave generator for producing a second pulse train at twice the period and pulse width of said first pulse train, and coincidence means connected to receive both said pulse trains for deriving said keying pulses therefrom with a pulse width equal to that of said first pulse train and a period equal to that of said second pulse train; and transmitting means for radiating said modulated carrier wave.

2. A radio beacon comprising a square wave generator producing a first pulse train; bistable means connected to said square wave generator for producing a second pulse train at twice the period and pulse width of said first pulse train; coincidence means connected to receive both said pulse trains for deriving therefrom a keying signal with pulses of a width equal to that of said first pulse train and a period equal to that of said second pulse train; a high-frequency oscillator; a low-frequency oscillator; modulating means connected to receive the outputs of said oscillators for generating a modulated carrier wave; control means connected to said coincidence means and to at least one of said oscillators for interrupting said modulated carrier wave in the rhythm of said keying signal and transmitting means for radiating said modulated carrier wave.

3. A radio beacon comprising first and second oscillator means; first and second modulating means respectively connected to said first and second oscillating means for respectively generating a first and a second modulated carrier wave; a first pulse source with two outputs for generating a pair of relatively staggered trains of keying pulses; a second pulse source independent of said first pulse source having an output for generating a further train of keying pulses; first control means connected to said first oscillator means and to one output of said first pulse source for interrupting said first modulated carrier wave in the rhythm of one of said relatively staggered trains of keying pulses second control means connected to said second oscillator means and to the other output of said first pulse source for normally interrupting said second modulated carrier wave in the rhythm of the other of said relatively staggered trains of keying pulses, said second control means being further connected to the output of said second pulse source for interrupting said second modulated carrier wave in the rhythm of said further train of keying pulses upon failure of said first pulse source; and transmitter means for radiating said first and second modulated carrier waves.

4. A radio beacon as defined in claim 3 wherein said first pulse source comprises a square wave generator producing a first pulse train; bistable means connected to said square wave generator for producing a second pulse train at twice the period and pulse width of said first pulse train and a third pulse train representing the complement of said second pulse train; first coincidence means connected to receive said first and second pulse trains for generating one of said relatively staggered trains of keying pulses on said one output; and second coincidence means connected to receive said first and third pulse trains for generating the other of said relatively staggered trains of keying pulses on said other output.

5. A radio beacon as defined in claim 3 wherein said second control means comprises an amplifier stage having an input connected in parallel to said other output of said first pulse source and to the output of said second pulse source.

* * * * *